US007606182B2

(12) United States Patent
Park et al.

(10) Patent No.: US 7,606,182 B2
(45) Date of Patent: Oct. 20, 2009

(54) COOPERATIVE RELAY TRANSMISSION METHOD FOR A WIRELESS COMMUNICATION SYSTEM

(75) Inventors: Seung-Young Park, Yongin-si (KR);
Dae-Young Park, Seoul (KR);
Sang-Boh Yun, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 475 days.

(21) Appl. No.: 11/481,170

(22) Filed: Jul. 5, 2006

(65) Prior Publication Data

US 2007/0002766 A1    Jan. 4, 2007

(30) Foreign Application Priority Data

Jul. 4, 2005    (KR) ...................... 10-2005-0059900

(51) Int. Cl.
*H04B 7/14* (2006.01)
(52) U.S. Cl. ..................... 370/279; 370/280; 370/315; 455/11.1
(58) Field of Classification Search ........................ None
See application file for complete search history.

(56) References Cited

U.S. PATENT DOCUMENTS

2004/0131025 A1*   7/2004   Dohler et al. ............... 370/328
2004/0266339 A1   12/2004   Larsson
2005/0014464 A1*   1/2005   Larsson ..................... 455/11.1

FOREIGN PATENT DOCUMENTS

EP           1 170 901       4/2001

OTHER PUBLICATIONS

Nosratinia et al., Cooperative Communication in Wireless Networks, IEEE Communications Magazine, Oct. 2004.
Sendonaris et al., User Cooperation Diversity—Part I: System Description, IEEE Transactions on Communications, vol. 51, No. 11, Nov. 2003.
Laneman et al., Cooperative Diversity in Wireless Networks: Efficient Protocols and Outage Behavior, IEEE Transactions on Information Theory, vol. 50, No. 12, Dec. 2004.
Pabst et al., Relay-Based Deployment Concepts for Wireless and Mobile Broadband Radio, IEEE Communications Magazine, Sep. 2004.

(Continued)

*Primary Examiner*—Jayanti K Patel
*Assistant Examiner*—Anthony Sol
(74) *Attorney, Agent, or Firm*—The Farrell Law Firm, LLP (57) ABSTRACT

Disclosed is a method in a base station for providing a network access service to terminals. Where one of the terminals is selected as a source terminal and at least one of the other terminals is used as a relay node for relaying communication between the base station and the source terminal. Parameters for relay communication are initialized. A relay communication request message including that the parameters is transmitted. In response to the message, a terminal independently sets and performs the relay communication between the base station and the source terminal. Uplink signals are received from the source and relay terminals. The uplink signals received from the source and relay terminals are combined and decoded. A transmit diversity gain is obtained in uplink transmission of a terminal with a single antenna because relay nodes retransmit the source terminal's signal.

13 Claims, 4 Drawing Sheets

OTHER PUBLICATIONS

Sreng et al., Relayer Selection Strategies in Cellular Networks with Peer-to-Peer Relaying, 2003 IEEE.

Laneman et al., An Efficient Protocol for Realizing Cooperative Diversity in Wireless Networks, 2001 IEEE.

Zhao et al., Practical Relay Networks: A Generalization of Hybrid-ARQ, IEEE Journal on Selected Areas in Communications, vol. 23, No. 1, Jan. 2005.

* cited by examiner

COOPERATIVE RELAY TRANSMISSION METHOD FOR A WIRELESS COMMUNICATION SYSTEM

PRIORITY

This application claims priority under 35 U.S.C. § 119 to an application entitled "Cooperative Relay Transmission Method for a Wireless Communication System" filed in the Korean Intellectual Property Office on Jul. 4, 2005 and assigned Serial No. 2005-59900, the contents of which are incorporated herein by reference.

BACKGROUND OF THE INVENTION

1. Field of the Invention

The present invention relates generally to a wireless communication system, and in particularly, to a cooperative relay transmission method for a wireless communication system that can obtain a diversity gain by sharing transmission from a transmitter to a receiver with adjacent relay terminals.

2. Description of the Related Art

Generally, transmit diversity is implemented through data transmission using multiple transmit antennas. A typical example is a Multiple-Input Multiple-Output (MIMO) system. The MIMO system is combined with a space-time coding scheme and is being established as a wireless communication standard. A transmit diversity technique based on the MIMO system can be effectively applied to downlink transmission of a base station in a cellular communication system. However, there are limitations in applying the transmit diversity technique using multiple antennas in uplink transmission due to hardware limitations in terms of a size or manufacturing cost of a terminal.

SUMMARY OF THE INVENTION

Accordingly, the present invention has been designed to solve the above and other problems occurring in the prior art. Therefore, it is an object of the present invention to provide a cooperative relay transmission method that can obtain a transmit diversity gain in an uplink as well as a downlink when a transmitting terminal shares transmission to a base station with other terminals serving as relay nodes or possible relay nodes.

It is another object of the present invention to provide a cooperative relay transmission method that can optimally maintain the number of relay terminals for a specific source terminal. This method is accomplished by broadcasting a threshold value of distance or channel quality between a base station and a relay terminal under control of the base station in order to set the relay terminal and can improve reception performance of the base station as well as a diversity gain.

In accordance with an aspect of the present invention, there is provided a cooperative relay transmission method for a wireless communication system configured by a plurality of terminals and one base station for providing a network access service to the plurality of terminals in which one of the plurality of terminals is selected as a source terminal and at least one of the other terminals is used as a relay node for relaying communication between the base station and the source terminal, the method includes initializing parameters for relay communication in the base station; broadcasting a relay communication request message having the parameters; independently setting a relay terminal for performing the relay communication between the base station and the source terminal among the plurality of terminals, in a possible relay terminal, in response to the relay communication request message; receiving uplink signals from the source terminal and relay terminals; and combining and decoding the uplink signals received from the source and relay terminals.

Preferably, the parameters include the maximum number of relay terminals ($N_{max}$), the minimum number of relay terminals ($N_{min}$), and a required channel quality (Q) together with an allowable relay distance (D) for setting a relay terminal.

Preferably, the step of setting the relay terminal includes measuring a channel quality ($Q_{present}$) linked to the base station in a terminal receiving the relay communication request message; determining whether a condition of $Q<Q_{present}$ is satisfied; and activating a relay function if the condition of $Q<Q_{present}$ is satisfied and transmitting an acknowledgement message from the relay terminal to the base station.

Preferably, the step of setting the relay terminal includes identifying the present number of relay terminals ($Q_{present}$) through control channel monitoring in the base station; determining whether a condition of $N_{max}>N_{present}$ is satisfied; incrementing the required channel quality (Q) if the condition of $N_{max}>N_{present}$ is not satisfied; determining whether a condition of $N_{min}<N_{present}$ is satisfied if the condition of $N_{max}>N_{present}$ is satisfied; and decrementing the required channel quality (Q) if the condition of $N_{max}<N_{present}$ is not satisfied.

Preferably, the step of setting the relay terminal includes measuring a distance ($D_{present}$) from the base station in a terminal receiving the relay communication request message; determining whether a condition of $D>D_{present}$ is satisfied; and activating a relay function if the condition of $D>D_{present}$ is satisfied and transmitting an acknowledgement message from the relay terminal to the base station.

Preferably, the step of receiving the uplink signals includes receiving the uplink signal in the relay terminal; decoding the uplink signal; and transmitting the uplink signal to the base station only when the decoding is successful.

Preferably, the step of receiving the uplink signals includes: decoding the uplink signals received from the base station and the relay terminal; temporarily storing the uplink signal when the decoding is successful in the relay terminal; broadcasting a re-transmission request message when the decoding fails in the base station; and transmitting a temporarily stored uplink message to the base station when the relay terminal receives the re-transmission request message. Preferably, the number of possible relay terminals must be uniformly maintained such that link performance can be uniformly maintained. For this, the base station suitably adjusts and broadcasts the parameters for relay communication, such that the number of possible relay terminals is uniformly maintained and managed.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION OF THE PREFERRED EMBODIMENTS

Hereinafter, a cooperative relay transmission method for a wireless communication system in accordance with the present invention will be described with reference to the accompanying drawings.

An example in which a terminal at a transmitting side performs uplink transmission to a base station at a receiving side in a cellular environment will be described. In the present invention, it is assumed that terminals can receive an uplink signal from a different terminal.

Figure 1:
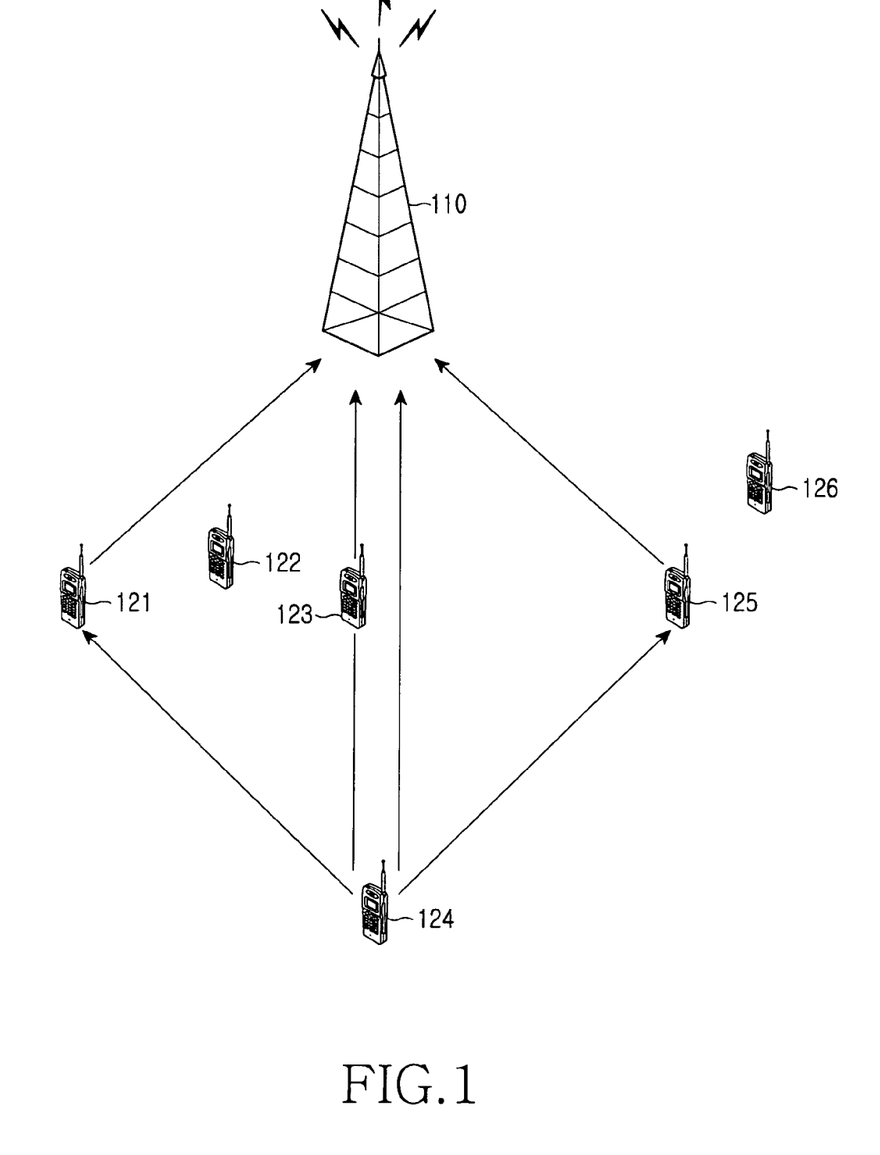
FIG. 1 illustrates a structure of a wireless communication system to which a cooperative relay transmission method of the present invention is applied.

FIG. 1 illustrates a structure of a wireless communication system to which a cooperative relay transmission method of the present invention is applied.

As illustrated in FIG. 1, a plurality of terminals 121, 122, 123, 124, 125, and 126 are present within a service area of a base station 110. Among these terminals, Terminal #4 (124) attempts packet transmission to the base station 110. For convenience of explanation, Terminal #4 attempting the transmission is called a source terminal.

When Terminal #4 124 transmits a packet to the base station 110, Terminals #1 (121), #2 (122), #3 (123), #5 (125), and #6 (126) as well as the base station 110 receive the packet.

When the packet is received from Terminal #4, the terminals #1 (121), #2 (122), #3 (123), #5 (125), and #6 (126) decode the received packet. When the terminals have successfully decoded the received packet, they attempt a relay operation, respectively. In FIG. 1, Terminals #1 (121), #3 (123), and #5 (125) become possible relay terminals that have successfully decoded the received packet.

A relay operation of the possible relay terminal is determined according to whether the decoding operation is successful or a Signal-to-Noise Ratio (SNR) is satisfied between a predefined base station and a relay terminal, or whether both the criterions are satisfied. In FIG. 1, Terminals #2 (122) and #6 (126) are terminals in which the decoding operation fails or a threshold SNR is not satisfied, or are terminals in sleep mode.

Figure 2:
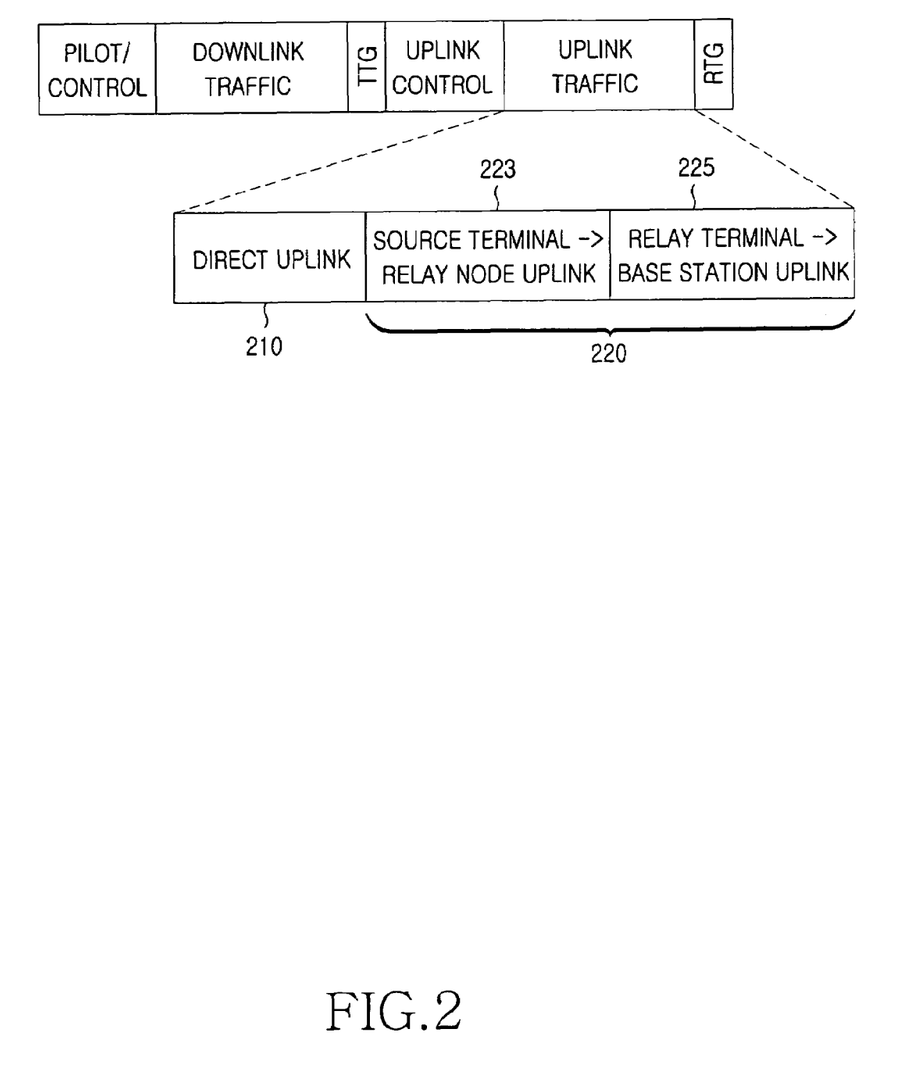
FIG. 2 illustrates a structure of an uplink frame for the cooperative relay transmission method of the present invention.

FIG. 2 illustrates a structure of an uplink frame for the cooperative relay transmission method of the present invention. It is assumed that the present invention utilizes Time Division Duplexing (TDD). A traffic field of the uplink frame includes a direct transmission frame 210 for directly transmitting a signal from a source terminal to a base station and a relay transmission frame 220 for transmitting a signal from the source terminal to the base station through a relay node. The relay transmission frame 220 includes a source terminal→relay node frame 223 for retransmitting the signal from the source terminal to the relay node and a relay node→base station frame 225 for transmitting the signal from the relay node to the base station.

Next, the cooperative relay transmission method for the wireless communication system configured as described above will be described in more detail.

A base station transmits, to terminals, a threshold value of a relay function parameter for setting activation of a relay function of each terminal through a control channel. Each terminal compares the present value with the threshold value of the relay function parameter, and determines whether a relay node operation is required upon receiving an uplink signal from the source terminal.

Once the source terminal is set and the base station allocates resources to the source terminal, the source terminal transmits data in an uplink frame. The base station and relay terminals entering relay node receive the uplink frame.

Upon receiving the uplink frame, the relay terminal attempts to detect data transmitted in the uplink frame. If the relay terminal has successfully detected the transmitted data, it transmits an associated uplink frame to the base station.

The base station combines the uplink frame directly received from the source terminal and the uplink frame received from the relay node and then detects the transmitted data.

In this case, the source terminal transmits the same data in the direct transmission frame 210 and the relay transmission frame 220 constructing the uplink traffic of FIG. 2 After the base station receives the relay node→base station frame 225 of the relay transmission frame 220 from the relay node even when receiving the direct transmission frame 210, it combines the relay node→base station frame 225 of the relay transmission frame 220 with the direct transmission frame 210 and performs the decoding operation (refer to FIG. 2). Because the base station combines signals received from the source terminal and at least one relay terminal and performs the decoding operation on the combined signals as described above, it can obtain a transmit diversity gain.

Figure 3:
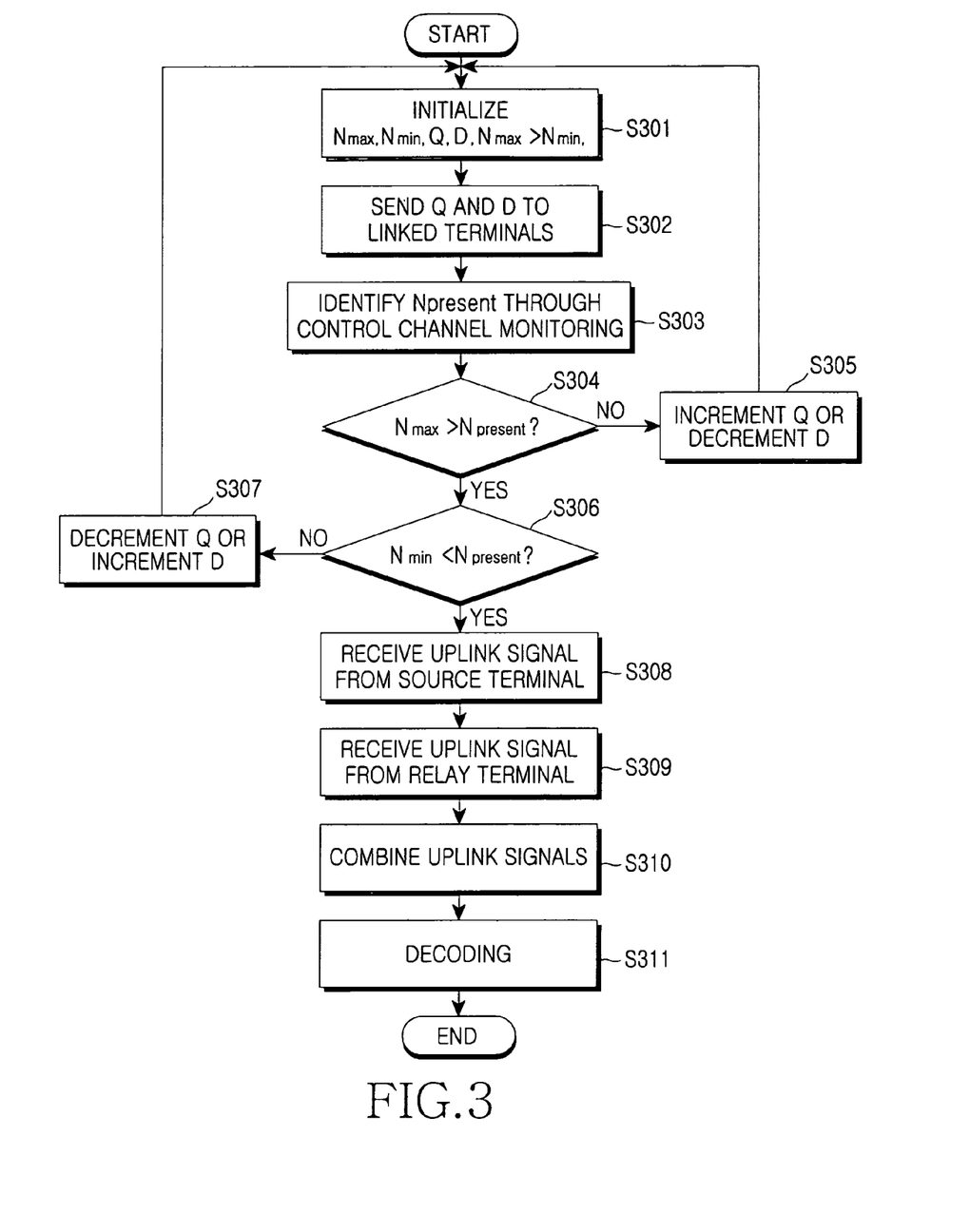
FIG. 3 is a flowchart illustrating the cooperative relay transmission method in accordance with a first embodiment of the present invention.

FIG. 3 is a flowchart illustrating the cooperative relay transmission method in accordance with a first embodiment of the present invention.

As illustrated in FIG. 3, a base station initializes parameters for relay communication (Step S301). The parameters for relay communication include the maximum number of relay terminals, $N_{max}$, the minimum number of relay terminals, $N_{min}$, and a required relay channel quality Q and an allowable relay distance D corresponding to parameters for setting a relay function of a terminal. When the initialization is completed, the base station sends the relay channel quality Q and the allowable relay distance D to linked terminals (Step S302).

Upon receiving Q and D, each terminal measures a channel state $Q_{present}$ and a distance $D_{present}$ associated with the base station and then compares $Q_{present}$ and $D_{present}$ with Q and D. When either one or both of the two conditions are satisfied, the terminal activates its relay function and becomes a possible relay terminal. The activation of the relay function indicates that an associated terminal becomes a possible relay terminal capable of performing the relay function when receiving an uplink signal from the source terminal. When the possible relay terminal receives an uplink signal from an associated source terminal and successfully decodes the received signal, it becomes a relay terminal for the associated source terminal. The relay terminal again encodes and transmits the decoded signal in a predefined interval or again encodes and transmits the decoded signal in an interval defined at the time of receiving a relay request from the base station. At this time, the relay terminal measures its channel, linked to the base station, measured after receiving the relay request, compensates in advance for variation in a phase of a signal generated at a relay transmission time, and transmits the signal. When relay signals destined for the base station are received, reception performance can be further improved because signal phases are the same as each other even though multiple relay terminals transmit the relay signals for an identical terminal.

The base station monitors a control channel and identifies the present number of relay terminals, $N_{present}$, on a source terminal-by-source terminal basis (Step S303), and determines whether a condition of $N_{max}>N_{present}$ is satisfied (Step S304). If the condition of $N_{max}>N_{present}$ is not satisfied as a determination result, a Q value is incremented or a D value is decremented (Step S305) and the initialization is again performed (Step S301). However, if the condition of $N_{max}>N_{present}$ is satisfied, a determination is made as to whether a condition of $N_{min}<N_{present}$ is satisfied (Step S306). If the condition of $N_{min}<N_{present}$ is not satisfied as a determination result, the Q value is decremented or the D value is incremented (Step S307) and the initialization is again performed (Step S301). If the two conditions are satisfied, the base station receives a direct uplink signal 210 from the source terminal (Step S308) and receives a relay uplink signal 220 from a relay terminal (Step S309). Then, the base station combines the received uplink signals received from the source and relay terminals (Step S310) and decodes the combined signals (Step S311).

Figure 4:
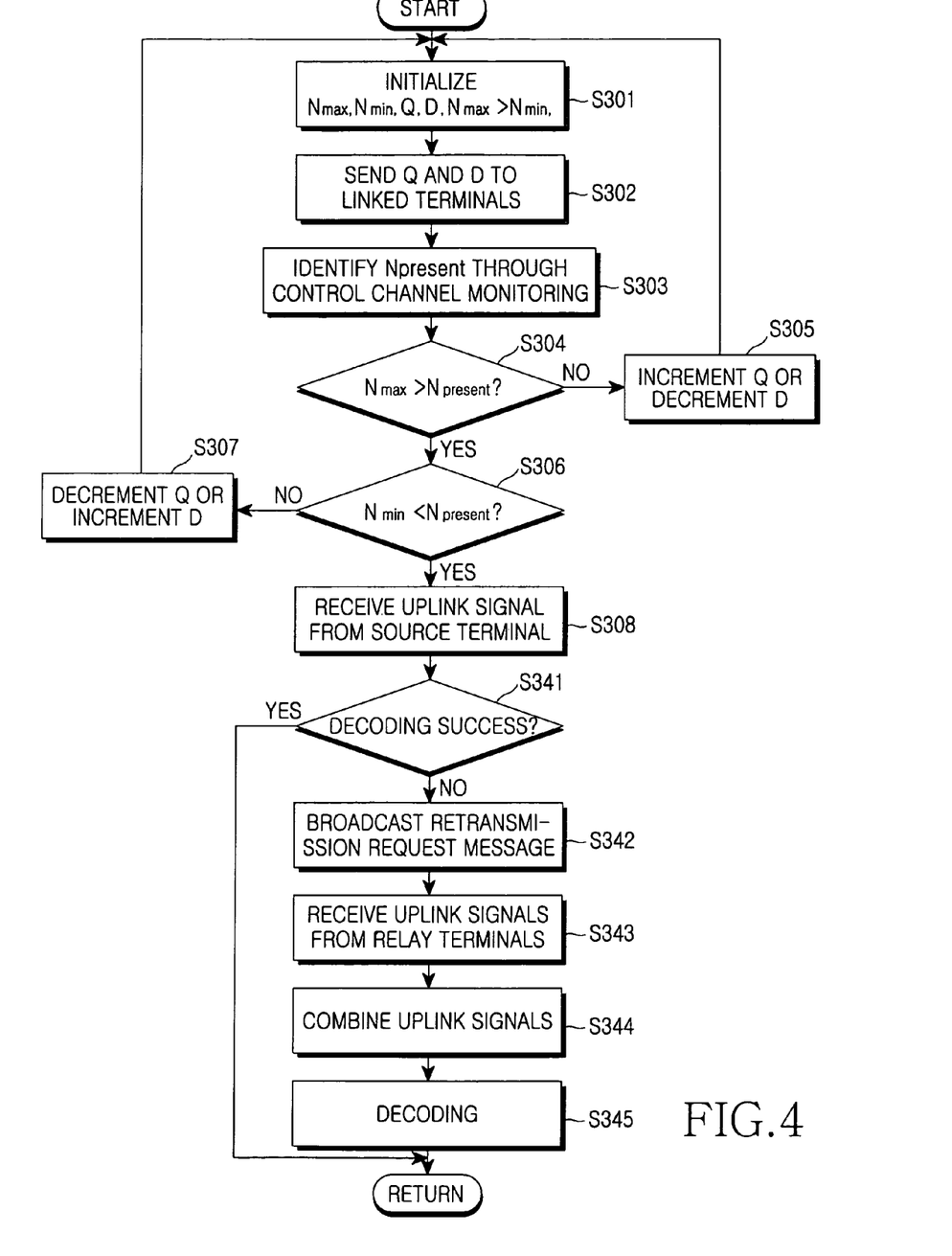
FIG. 4 is a flowchart illustrating the cooperative relay transmission method in accordance with another embodiment of the present invention.

FIG. 4 is a flowchart illustrating the cooperative relay transmission method in accordance with another embodiment of the present invention.

The cooperative relay transmission method performs a procedure in the same manner that the base station performs an initialization process and receives an uplink signal in the cooperative relay transmission method in accordance with the first embodiment. When the base station receives an uplink signal from a source terminal in the cooperative relay transmission method in accordance with the second embodiment of the present invention (Step S308), it decodes the received signal and determines whether the decoding operation is successful (Step S341). If the decoding operation is successful, the base station receives the next signal from the source terminal. However, if the decoding operation fails, the base station broadcasts a re-transmission request message (Step S342).

On the other hand, when a possible relay terminal receives an uplink signal from the source terminal in the cooperative relay transmission method in accordance with the second embodiment, it decodes the received signal. If the decoding operation is successful, the possible relay terminal becomes a relay terminal and temporarily stores the uplink signal. Upon receiving a re-transmission request message from the base station, the relay terminal transmits the temporarily stored uplink signal to the base station.

In response to the re-transmission request message, the base station receives uplink signals from the relay terminals (Step S343), combines the received uplink signals (Step S344), and decodes the combined signals (Step S345).

In this embodiment, all relay terminals transmit an uplink signal upon receiving a retransmission request message and successfully performing a decoding operation, respectively. Alternatively, one terminal can transmit an uplink signal when it has the best channel state or is closest to a base station by considering Q and D values.

As described above, the cooperative relay transmission method of the present invention can obtain a transmit diversity gain in uplink transmission of a terminal with a single antenna because relay nodes receive and re-transmit an uplink signal of a source terminal. Moreover, the cooperative relay transmission method of the present invention adjusts a threshold value of distance or channel quality between a base station and a relay node for determining a relay terminal and optimally maintains the number of relay terminals for a specific source terminal, thereby improving the reliability of a reception signal process of the base station as well as the diversity gain.

Although preferred embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A cooperative relay transmission method for use in a base station of a wireless communication system configured by a plurality of terminals and the base station for providing a network access service to the plurality of terminals in which one of the plurality of terminals is selected as a source terminal and at least one of the other terminals is used as a relay node for relaying communication between the base station and the source terminal, comprising:

initializing parameters for relay communication;

broadcasting a relay communication request message comprising the parameters;

setting a possible relay terminal for performing the relay communication between the base station and the source terminal among the plural of terminals in response to the relay communication request message;

receiving uplink signals from the source terminal and relay terminals; and combining and decoding the uplink signals received from the source terminal and relay terminals, wherein the parameters include a maximum number of relay terminals ($N_{max}$), a minimum number of relay terminals ($N_{min}$), and a required channel quality (Q) and an allowable relay distance (D) for setting a relay terminal, and wherein the step of setting the relay terminal comprises:

measuring a channel quality ($Q_{present}$) linked to the base station in a terminal receiving the relay communication request message;

determining whether a condition of $Q<Q_{present}$ is satisfied;

activating a relay function if the condition $Q>Q_{present}$ is satisfied;

identifying a present number of relay terminals ($Q_{present}$) through control channel monitoring in the base station;

determining whether a condition of $N_{max}>N_{present}$ is satisfied;

incrementing the required channel quality (Q) if the condition of $N_{max}>N_{present}$ is not satisfied;

determining whether a condition of $N_{min}>N_{present}$ is satisfied if the condition of $N_{max}>N_{present}$ is satisfied; and decrementing the required channel quality (Q) if the condition of $N_{min}>N_{present}$ is not satisfied.

2. The cooperative relay transmission method of claim 1, wherein receiving the uplink signals comprises:

receiving the uplink signal in the possible relay terminal;

decoding the uplink signal; and setting the possible relay terminal to the relay terminal when the decoding is successful, compensating the uplink signal for signal phase variation clue to a channel between the relay terminal and the base station, and transmitting the compensated uplink signal to the base station.

3. The cooperative relay transmission method of claim 1, wherein receiving the uplink signals comprises:

receiving the uplink signal in the relay terminal;

decoding the uplink signal; and setting the possible relay terminal to the relay terminal only if a value of a channel state between the base station and the possible relay terminal is more than a threshold value defined in a relay parameter among possible relay terminals with a successful decoding operation, compensating the uplink signal for signal phase variation due to a channel between the relay terminal and the base station, and transmitting the compensated uplink signal to the base station.

4. A cooperative relay transmission method for use in a base station of a wireless communication system configured by a plurality of terminals and the base station for providing a network access service to the plurality of terminals in which one of the plurality of terminals is selected as a source terminal and at least one of the other terminals is used as a relay node for relaying communication between the base station and the source terminal, comprising the steps of:

initializing parameters for relay communication;
  broadcasting a relay communication request message comprising the parameters;
  setting a possible relay terminal for performing the relay communication between the base station and the source terminal among the plurality of terminals in response to the relay communication request message;
  receiving uplink signals from the source terminal and relay terminals; and
  combining and decoding the uplink signals received from the source terminal and relay terminals,
  wherein the parameters include a maximum number of relay terminals ($N_{max}$), a minimum number of relay terminals ($N_{min}$), and a required channel quality (Q) and an allowable relay distance (D) for setting a relay terminal, and wherein the setting the relay terminal comprises the steps of:
  measuring a distance ($D_{present}$) from the base station in a terminal receiving the relay communication request message;
  determining whether a condition of $D>D_{present}$ is satisfied; and
  activating a relay function if the condition of $D>D_{present}$ is satisfied.

5. The cooperative relay transmission method of claim 4, wherein setting the relay terminal further comprises:
  identifying a present number of relay terminals ($Q_{present}$) through control channel monitoring in the base station;
  determining whether a condition of $N_{max}>N_{present}$ is satisfied;
  incrementing the required channel quality (Q) if the condition of $N_{max}>N_{present}$ is not satisfied;
  determining whether a condition of $N_{min}<N_{present}$ is satisfied if the condition of $N_{max}>N_{present}$ is satisfied; and
  decrementing the required channel quality (Q) if the condition of $N_{min}<N_{present}$ is not satisfied.

6. The cooperative relay transmission method of claim 4, wherein setting the relay terminal comprises:
  measuring a channel quality ($Q_{present}$) linked to the base station in a terminal receiving the relay communication request message;
  determining whether a condition of $Q<Q_{present}$ is satisfied; and
  activating a relay function if the condition of $Q<Q_{present}$ is satisfied.

7. The cooperative relay transmission method of claim 6, wherein setting the relay terminal further comprises:
  identifying a present number of relay terminals ($Q_{present}$) through control channel monitoring in the base station;
  determining whether a condition of $N_{max}>N_{present}$ is satisfied;
  incrementing the required channel quality (Q) if the condition of $N_{max}>N_{present}$ is not satisfied;
  determining whether a condition of $N_{min}<N_{present}$ is satisfied if the condition of $N_{max}>N_{present}$ is satisfied; and
  decrementing the required channel quality (Q) if the condition of $N_{min}<N_{present}$ is not satisfied.

8. The cooperative relay transmission method of claim 4, wherein receiving the uplink signals comprises:
  receiving the uplink signal in the possible relay terminal;
  decoding the uplink signal; and
  setting the possible relay terminal to the relay terminal when the decoding is successful, compensating the uplink signal for signal phase variation due to a channel between the relay terminal and the base station, and transmitting the compensated uplink signal to the base station.

9. The cooperative relay transmission method of claim 4, wherein receiving the uplink signals comprises:
  receiving the uplink signal in the relay terminal;
  decoding the uplink signal; and
  setting the possible relay terminal to the relay terminal only if a value of a channel state between the base station and the possible relay terminal is more than a threshold value defined in a relay parameter among possible relay terminals with a successful decoding operation, compensating the uplink signal for signal phase variation due to a channel between the relay terminal and the base station, and transmitting the compensated uplink signal to the base station.

10. A cooperative relay transmission method for use in a base station of a wireless communication system configured by a plurality of terminals and the base station for providing a network access service to the plurality of terminals in which one of the plurality of terminals is selected as a source terminal and at least one of the other terminals is used as a relay node for relaying communication between the base station and the source terminal, comprising:
  initializing parameters for relay communication;
  broadcasting a relay communication request message comprising the parameters;
  setting a possible relay terminal for performing the relay communication between the base station and the source terminal among the plurality of terminals in response to the relay communication request message;
  receiving uplink signals from the source terminal and relay terminals; and
  combining and decoding the uplink signals received from the source terminal and relay terminals, wherein receiving the uplink signals comprises:
  decoding the uplink signals received from the source terminal and the possible relay terminal;
  temporarily storing the uplink signal when the decoding is successful in the possible relay terminal;
  broadcasting a re-transmission request message when the decoding fails in the base station; and
  setting the possible relay terminal to the relay terminal only if the possible relay terminal has a value of more than a threshold value defined in a relay parameter upon receiving the retransmission request message, compensating for signal phase variation due to a channel between the relay terminal and the base station, and transmitting a temporarily stored uplink message to the base station.

11. The cooperative relay transmission method of claim 10, wherein the parameters include a maximum number of relay terminals ($N_{max}$), a minimum number of relay terminals ($N_{min}$), and a required channel quality (Q) and an allowable relay distance (D) for setting a relay terminal.

12. The cooperative relay transmission method of claim 11, wherein setting the relay terminal comprises:

measuring a channel quality ($Q_{present}$) linked to the base station in a terminal receiving the relay communication request message;

determining whether a condition of $Q<Q_{present}$ is satisfied; and activating a relay function if the condition of $Q<Q_{present}$ is satisfied.

13. The cooperative relay transmission method of claim 12, wherein setting the relay terminal further comprises:

identifying a present number of relay terminals ($Q_{present}$) through control channel monitoring in the base station;

determining whether a condition of $N_{max}>N_{present}$ is satisfied;

incrementing the required channel quality (Q) if the condition of $N_{max}>N_{present}$ is not satisfied;

determining whether a condition of $N_{min}>N_{present}$ is satisfied if the condition of $N_{max}>N_{present}$ is satisfied; and decrementing the required channel quality (Q) if the condition of $N_{min}<N_{present}$ is not satisfied.

* * * * *

UNITED STATES PATENT AND TRADEMARK OFFICE
CERTIFICATE OF CORRECTION

PATENT NO. : 7,606,182 B2 Page 1 of 1
APPLICATION NO. : 11/481170
DATED : October 20, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 582 days.

Signed and Sealed this

Fifth Day of October, 2010

David J. Kappos
*Director of the United States Patent and Trademark Office*